July 28, 1953   J. WEBER   2,646,979
WEIGHING SCALE
Filed March 7, 1950   2 Sheets-Sheet 1
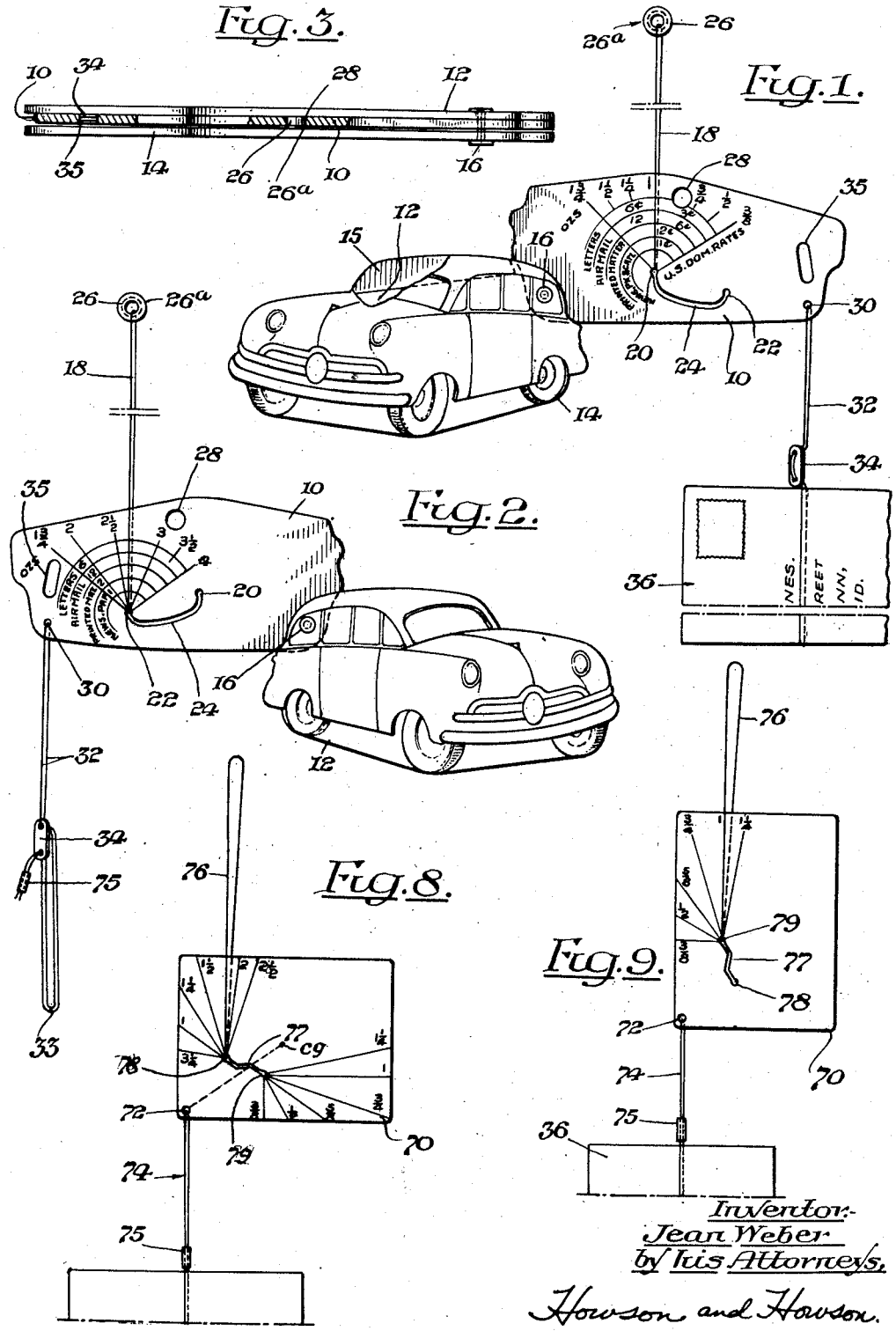
Inventor:
Jean Weber
by his Attorneys,
Howson and Howson.

July 28, 1953 — J. WEBER — 2,646,979
WEIGHING SCALE
Filed March 7, 1950 — 2 Sheets-Sheet 2
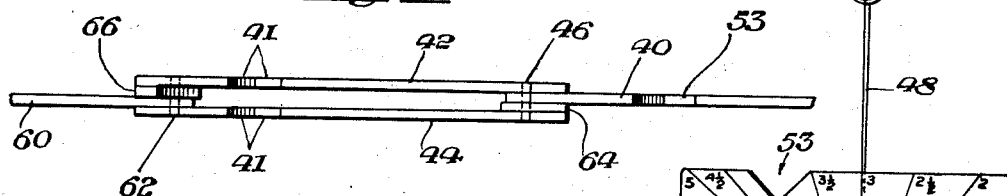
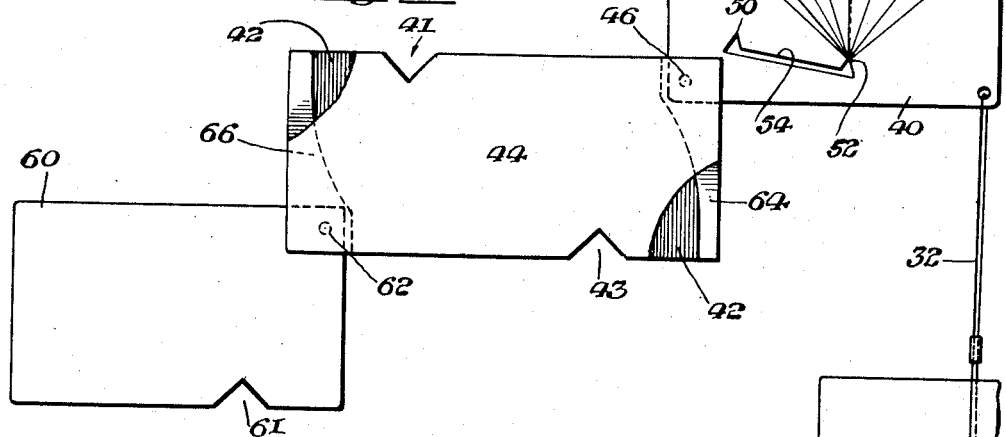
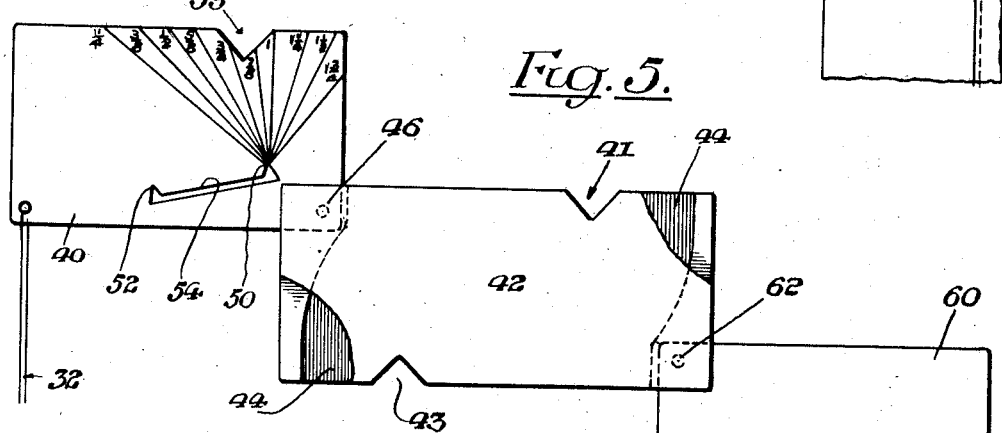
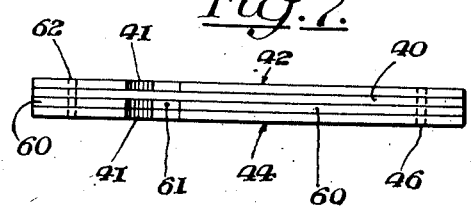
Inventor:
Jean Weber
by his Attorneys,
Howson and Howson Patented July 28, 1953

2,646,979

UNITED STATES PATENT OFFICE 2,646,979

WEIGHING SCALE

Jean Weber, South Orange, N. J.

Application March 7, 1950, Serial No. 148,049

12 Claims. (Cl. 265—61)

This invention relates to weighing scales, and more particularly to small size or pocket scales, particularly adapted for weighing small articles such, for example, as letters, although the invention is not limited in that respect.

Heretofore the various inventions of pocket scales have had little appeal because they had only one fulcrum point for a given range of weights and were thus not sensitive enough for accuracy over the whole range; or because in the "Danish Balance" type the fulcrum had to be moved for every different weight or variation of weight to be measured.

Therefore it is an object of my invention to provide an improved construction for small weighing scales which is provided with means for more accurately measuring weights over a wider range than heretofore.

Another object is to provide a scale of the above type with two fulcrum points connected so as to enable the supporting means to be moved from one fulcrum point to another for measuring smaller or greater weights as occasion requires, and to measure different weights more sensitively.

Another object is to provide a scale of the foregoing type with one or more counterpoises pivotally and slidably connected to one another to the beam member having the fulcrum point, so as to permit wider latitude in choice of materials (lighter or heavier as well as thicker and thinner) within the same or greater ranges of weights measurable.

Another object of my invention is to provide a scale of the foregoing type having pivotally connected parts adapted to act as counterpoises which can be slid or interleaved to compactly close when not in use.

Other objects and advantages of my invention will occur to those skilled in the art as the invention is described in connection with the accompanying drawings.

In the drawings:

Fig. 1 is an elevation view of one side of one form of my letter scale as used;

Fig. 2 is an elevation view of the other side of the scale illustrated in Fig. 1;

Fig. 3 is a view looking at the top edge of the letter scale of Figs. 1 and 2 when in register;

Fig. 4 is a front elevation view of another form of the scale embodying my invention having two counterpoise members;

Fig. 5 is an elevation view of the back side of the scale illustrated in Fig. 4;

Fig. 6 is a view looking into the top edge of the scale illustrated in Figs. 4 and 5;

Fig. 7 is a view looking at the top edge of the scale of Figs. 4 and 5 when the scale parts are in register.

Fig. 8 is an elevational view of one side of a third form of letter scale as used.

Fig. 9 is an elevational view of the other side of the third form of letter scale of Fig. 8 with the spring support in the other end of the slot.

Referring to Figs. 1-3 of the drawings, the scale comprises a beam member 10 pivotally connected to a counterpoise member. The counterpoise member may comprise a single panel or (as shown) parallel panels 12 and 14 joined together as hereinafter described at one edge. The beam member and counterpoise are pivoted together by a pivot 16 which may be a rivet or other like member. The beam member 10 may be a sheet of cardboard, metal, plastic, linoleum or other stiff material which in small sections is substantially rigid. The counterpoise member shown in Figs. 1-3 comprises two identical sheets 12 and 14 of any of the suitable materials such as those mentioned in connection with the beam member which sheets may be joined at one edge as by pasting the adjacent inside surfaces at an edge to a junction strip 15 of the same or similar material having approximately the same thickness as the beam member. The length of the junction piece 15 may be such as to form a limit or stop to the pivotal movement of the beam member about the pivot 16 so that it may not be moved counterclockwise beyond the position shown in Fig. 1. In such position, which is the position of normal use, the beam member and counterpoise are in maximum longitudinal extension. The joining together of the panels or sheets 12 and 14 by the junction member 15 causes the panels 10 and 12 to function as a unit. Similarly, instead of forming the two side panels 14 and 12 of the counterpoise separately and joining them, they may be a single sheet folded over.

For suspending the scale a thin string cord or thread 18, or the like, is looped through a slot 24 which terminates at each end in two fulcrum points 20 and 22. In order to avoid frictional drag of the string 18 against the sides of the beam member 10 during movement of the beam member, the string 18 also loops through a holder in shape of a ring or the like having a thickness equal to or slightly greater than the thickness of the beam member so that when the ring 26 is grasped by the fingers of the person using the scale, the parallel lengths of the string will not noticeably frictionally brush against the sides of the beam member during the balancing thereof.

In order to hold the letters or other articles which are to be weighed, there is a hole 30 in the beam member at the opposite end from the pivot 16 and on the other side of the fulcrum points 20 and 22 from the pivot 16. Through the hole 30 is threaded a string 32 on which is a clamp bar 34 comprising a short piece of fibre, cardboard, plastic or the like, having holes in opposite ends. Through these holes both ends of the string 32 pass and are then knotted or otherwise joined together. When a large envelope 36 or letter or other article is to be weighed, it may be supported within the single loop at the lower end of the string 32, as illustrated in Fig. 1, the clamp 34 being tightened up against the top edge to hold the letter. Thus the string passes around the envelope only once, as a large loop in which the large envelope may be conveniently held. If instead a small envelope or article is to be weighed, the bight of the string is pulled (that is to say the portion crossing the clamp in Fig. 1) so as to form a much smaller loop 33 (see Fig. 2) having a double strand of thread or string to pass around each side of the envelope. This smaller loop will much more conveniently receive the smaller envelopes. Thus an advantage of this type of clamp is that large envelopes can be held without using a larger amount of string.

A novel feature of the invention is the provision of the two fulcrum points 20, 22 each with a different range of scale graduations associated therewith so that letters or other articles of different weights may conveniently and accurately be weighed. When the suspension string 18 is at the fulcrum point 20, some loads (for example, from ⅜ to 1¾ ozs.) may most conveniently be weighed. However upon slipping the string 18 over to the fulcrum point 22 as is illustrated in Fig. 2, wherein the opposite side of the device of Fig. 1 is shown, different weights (for example from 1¾ to 4 ozs.) may be measured. It will be understood that the weights mentioned are merely exemplary and the invention is not limited in that respect. By having the fulcrum points connected by a slot, it is a simple matter to move the thread forming the fulcrum from one position to another as the need arises. By printing the scale graduation for the different weights on opposite sides of the beam member, overlapping of the scale markings is avoided.

The provision of two fulcrum points is desirable and indeed is essential in order to obtain a sufficient sensitivity for a range of weights large enough for the scale to be of practical value. Heretofore the various pocket scales have had little appeal because they all had only one fulcrum and therefore could not be sensitive enough for accuracy on a wide range. Not only is the range increased by the provision of two fulcrum points but the distribution of sensitivity is thereby according to need. Thus a given scale model can be adapted to American postal weights based upon a minimum of ½ oz. or to European conditions where the minimum weight to be considered is only ⅓ of the American minimum.

For easy and accurate readings, the graduations radiating upward from each fulcrum point may have greater length by locating the fulcrum points in the lower part of the beam member. In order to provide also for stable equilibrium, the center of gravity of the unfolded device must be located below the line joining the point of attachment 30 of the supporting string 32 and the lowest fulcrum point 22. The location of this center of gravity obviously varies, depending on the respective positions of the beam member and the counterpoise, that is to say on the location of the pivot 16. Hence the location of the pivot 16 must be chosen with due consideration for the resulting center of gravity of the unfolded device in order to locate the fulcrum points on the lower part of the beam member.

By reason of the construction just described, the beam member can pivot about the pivot 16 to interleave or fit as in a jack knife between the side panels 14 and 12 of the counterpoise member (see Fig. 3) when not in use. The counterpoise member may be of any desired shape or configuration, for example, in the shape of the automobile illustrated in Fig. 1. Thus the scale is adapted for use not only as a letter scale but also as an advertising novelty.

As heretofore indicated, the counterpoise need not necessarily be in the form of a sheet into which the beam member can be interleaved. Under some circumstances it may be desirable for the counterpoise to be a single sheet of material which however may be pivoted to rotate into register or to overlie the beam member. The beam member and counterpoise need not be of identical shape, and in fact ordinarily are not so. It is sufficient that the beam member have one dimension long enough so that it may be used as a balance arm for the article to be weighed and moreover shall have sufficient width for the scale graduations.

If desired for the purpose of neatly putting together the various parts of the device, the string 18 may be wound around the beam member just prior to the beam member being interleaved between the sides of the counterpoise member, and at the same time the supporting ring 26 may be fitted into a hole or aperture 28 in the beam member of substantially the same shape as the holder. To prevent the ring passing entirely through or falling out of the hole 28, the ring may have a flange 26a formed thereon.

For a like reason, an elongated aperture 35 of the same shape as the clamp member 34 is preferably formed in the beam member near the aperture 30. Thread 32 may be wound around the end of the beam member and the clamp 34 inserted in the aperture 35.

It will be understood that sufficient space should be provided between the counterpoise and the beam member to permit the thin strings to enter as the beam member is pivotally interleaved with the counterpoise; or the sides of the counterpoise may have sufficient flexibility to bend slightly to accommodate the string.

In Figs. 4 to 7 I have illustrated a form of the invention having two counterpoises. In this form the first or inner counterpoise as in Figs. 1 to 3 comprises parallel panels or plates 42, 44 made of any of the materials previously mentioned in rectangular or any other desired shape. To one corner is pivotally secured the beam member 40 by a rivet or like pivotal attachment means 46. At the diagonally opposite corner is pivotally attached a second or outer counterpoise 60 by a rivet or the like 62. The beam member 40 lies directly against the inside surface of the panel or sheet 42 of the first counterpoise. In order to maintain it in this plane, a spacer or flat strip insert 64 of substantially the same thickness as the beam member is secured adjacent one end of the inner counterpoise. The outer counterpoise 60 is held in a plane adjacent the inner surface of the panel or sheet member 44 of the inner counterpoise and is maintained in spaced relation to the other panel 42 by a similar spacer or insert strip member 66. Thus the counterpoise 60 is adapted to swing or interleave between the two panels 44 and 42 of the first counterpoise; and in like manner (and also similar to the beam member 14 of Figs. 1 to 3) the beam member 40 of Figs. 4 to 7 can swing or interleave between the panels 44 and 42 alongside of the counterpoise 60.

The suspension of the scale of Figs. 4 to 7 is by equivalent or identical means as in the case of Figs. 1–3. Thus the fulcrum points 50 and 52 are joined by a slot 54 in like manner to slot 24 joining the pivot points 20 and 22 (Fig. 1). Also the string 48 supports the beam 40 as string 18 supports beam member 10.

Under some circumstances it may be desirable not to employ a separate counterpoise. In Figs. 8 and 9 the invention is adapted to a letter scale which has no separate counterpoise but which has the advantage of the two fulcrum points. In this form of the invention a plate of sheet metal, fibre, cardboard or other stiff or semi-rigid material 70 may be employed. In one corner of the plate a small aperture 72 for the supporting string 74 may be secured, having on its lower end a paper clip or slider 75 or like article for frictionally holding the letter or article to be weighed. In order to suspend the scale a string or thread 76 may be employed, being looped through a slot 77 having on opposite ends fulcrum points 78 or 79 which may be used alternately. When the fulcrum point 78 is used, heavier weights may be measured than when the fulcrum point 79 is used because the point 78 being nearer the point of support 72 than is the point 79, it (point 78) affords a shorter lever or beam arm. The form of invention illustrated in Figs. 8 and 9 ordinarily requires a larger device or heavier material, if the same weights are to be measured as those measured by the form having a pivoted counterpoise. Thus although each form is better able to satisfy certain particular conditions of use, there are some conditions in which either form could be used equally well.

In Figs. 8 and 9 the two fulcrum points are preferably placed on opposite sides of the theoretical beam line (dotted) passing through the center of gravity $cg$ and the point where the object to be weighed is hanging. In that case the scale graduations for the fulcrum point 78 can be located on the same side of the plate 70 as the scale graduations for the fulcrum point 79 without overlapping.

In any of the forms of the invention described, the means for holding the envelope or other article may be other than the slider and the clamp arrangement 34 illustrated, the invention not being limited thereto.

Referring to the form of Figs. 4 to 7, to avoid difficulty in pulling the beam member and outer counterpoise out from the sheathed or interleaved position, and in order to facilitate such pulling out, I provide in the top and bottom edges of the inner counterpoise member 44, V-shaped, or other recesses, 41, 43. In that position to align or register with the slot 41 is a similar slot 61 in the outer counterpoise 60. Due to the registration of the slots 41 and 61, it is possible to grasp the beam member when interleaved or sheathed within the counterpoise 40 to pull it out therefrom.

In like manner a slot 53 in the beam member 40 is adapted to register with the slot 43 of the inner counterpoise when the beam member is sheathed within it. Thus the edge of the sheathed counterpoise 60 may be grasped and then pivoted outwardly into the position of Fig. 4.

What is claimed is:

1. A weighing scale comprising a flat sheet beam member, means attached near one edge to hold a small light object whose weight is to be measured, two fulcrum points in said beam member connected by a slot, said fulcrum points being at opposite ends of said slot at different distances from the point of attachment of said holding means, one of said points being for weighing one range of weights and the other for weighing a different range of weights, supporting means for suspending said beam member for pivoting movement about either one of said fulcrum points, said supporting means being movable along said slot from one fulcrum point to the other without removal from the beam member, and scale graduations radiating from said different fulcrum points whereby different ranges of weights may be measured when said beam member is supported from one or the other of said fulcrum points by said suspending means, said supporting means having a rectilinear portion overlying one set of scale graduations or the other depending on the fulcrum point in which the supporting means is located at the moment, said supporting means thus indicating on said scale graduations the weight of the article being weighed.

2. A weighing scale comprising a flat sheet beam member, means attached near one edge to hold small light objects whose weight is to be measured, a slot in said beam member having two fulcrum points, said fulcrum points being at opposite ends thereof at different distances from the point of attachment of said holding means, one point being on one side and one on the other of a line between the point of attachment of said holding means and the center of gravity, supporting means for suspending said beam member for pivoting movement about one or the other of said fulcrum points, and non-overlapping scale graduations radiating in different directions from said fulcrum points, whereby different ranges of weights may be measured when said beam member is supported from one or the other of said fulcrum points by said suspending means.

3. A weighing scale as claimed in claim 1 having a counterpoise member of flat sheet material, and means pivotally connecting said beam member and said counterpoise member permitting them to be slid together in overlapping relation.

4. A weighing scale as claimed in claim 1 having a counterpoise member comprising parallel flat spaced panels, and means pivotally connecting said beam member and said counterpoise member for permitting the beam member to be interleaved between said panels when not extended in use.

5. A weighing scale as claimed in claim 4 wherein the suspending means comprises a looped cord, a holder on said cord thicker than the beam member to reduce frictional drag of the cord against the sides of the beam member.

6. A weighing scale as claimed in claim 1 having a counterpoise member comprising parallel flat spaced panels, and means pivotally connecting said beam member and said counterpoise member for permitting the beam member to be interleaved between said panels when not extended in use, said panels of the beam member being joined at one edge to form a unit and to stop the interleaving movement of the beam member in register with the counterpoise member.

7. A weighing scale as claimed in claim 3 having a plurality of counterpoise members made of flat sheet material, means pivotally connecting one to another to permit sliding of one in overlapping relation to another, when said beam is also overlapped therewith.

8. A weighing scale as claimed in claim 1 having a plurality of connected counterpoise members, means pivotally connecting adjacent counterpoise members together, and means pivotally connecting one counterpoise member to said beam member, one of said counterpoise members comprising parallel flat spaced panels permitting interleaving of said beam and other counterpoise member between said panels.

9. A weighing scale comprising a flat sheet beam member, a plurality of connected counterpoise members one of which is made of parallel flat panels, means pivotally connecting said beam member to said panelled counterpoise member, all said members being movable to interleave between said parallel counterpoise panels when not extended in use, means attached to said beam member to hold articles to be weighed, two fulcrum points in said beam member connected by a slot and spaced different distances from the point of attachment of said holding means, means to suspend said beam member from said different fulcrum points for pivotal movement to measure different ranges of weights according to the fulcrum point used.

10. A weighing scale comprising a flat sheet beam member, a plurality of connected counterpoise members, means pivotally connecting said beam member to one counterpoise member, all of said members being movable to slide in mutually overlapping relation when not extended in use, means attached to said beam member to hold articles to be weighed, two fulcrum points in said beam member connected by a slot and spaced different distances from the point of attachment of said holding means, means to suspend said beam member from said different fulcrum points for pivoted movement to measure different ranges of weights according to the fulcrum point used.

11. A weighing scale as claimed in claim 3 wherein the center of gravity of said counterpoise element and said beam member when they are extended in use is below the line between the point of attachment of the holding means and the fulcrum point.

12. A weighing scale as claimed in claim 5 having a recess in said beam member substantially of the size of said holder to receive the holder when said beam member and counterpoise member are not in use.

JEAN WEBER.

References Cited in the file of this patent

UNITED STATES PATENTS

| Number | Name | Date |
|---|---|---|
| 314,801 | Clausen | Mar. 31, 1885 |
| 920,200 | Emans | July 27, 1909 |
| 1,340,280 | McArdle | May 18, 1920 |
| 1,518,982 | Harrold | Dec. 9, 1924 |
| 1,600,539 | Emans | Sept. 21, 1926 |

FOREIGN PATENTS

| Number | Country | Date |
|---|---|---|
| 479,802 | Germany | July 23, 1929 |
| 550,654 | France | Dec. 20, 1922 |